(12) United States Patent
Oyama

(10) Patent No.: US 10,666,822 B2
(45) Date of Patent: May 26, 2020

(54) IMAGE FORMING DEVICE HAVING A PANEL BOARD WITH A TACTILE SWITCH

(71) Applicant: BROTHER KOGYO KABUSHIKI KAISHA, Nagoya-shi, Aichi-ken (JP)

(72) Inventor: Yoshihiro Oyama, Tokai (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 16/243,729

(22) Filed: Jan. 9, 2019

(65) Prior Publication Data

US 2019/0260894 A1  Aug. 22, 2019

(30) Foreign Application Priority Data

Feb. 21, 2018  (JP) ................... 2018-028909

(51) Int. Cl.
  *H04N 1/00* (2006.01)
  *G03G 15/00* (2006.01)
  *B41J 29/38* (2006.01)
  *B41J 29/13* (2006.01)

(52) U.S. Cl.
  CPC .......... *H04N 1/00522* (2013.01); *B41J 29/13* (2013.01); *B41J 29/38* (2013.01); *G03G 15/5016* (2013.01); *H04N 1/00103* (2013.01); *H04N 1/00384* (2013.01); *H04N 1/00411* (2013.01); *H04N 1/00496* (2013.01); *H04N 2201/006* (2013.01)

(58) Field of Classification Search
  CPC .......... H04N 1/00522; H04N 1/00103; H04N 1/00384; H04N 1/00411; H04N 1/00496; H04N 2201/006; B41J 29/38; G03G 15/5016

See application file for complete search history.

(56) References Cited

U.S. PATENT DOCUMENTS

| | | | |
|---|---|---|---|
| 2013/0063236 | A1 | 3/2013 | Shin et al. |
| 2014/0340315 | A1 | 11/2014 | Ikeda et al. |
| 2016/0191730 | A1 | 6/2016 | Ohata et al. |
| 2017/0257502 | A1* | 9/2017 | Onishi ............... H04N 1/00559 |
| 2017/0289371 | A1* | 10/2017 | Namba ................... B41J 29/38 |
| 2018/0207965 | A1 | 7/2018 | Suzuki et al. |

FOREIGN PATENT DOCUMENTS

| | | |
|---|---|---|
| JP | 2011-2947 A | 1/2011 |
| JP | 2013-62796 A | 4/2013 |
| JP | 2016-124195 A | 7/2016 |
| JP | 2016-221765 A | 12/2016 |
| JP | 2017-184199 A | 10/2017 |
| WO | 2014/136505 A1 | 2/2017 |

* cited by examiner

*Primary Examiner* — Iriana Cruz
(74) *Attorney, Agent, or Firm* — Merchant & Gould P.C.

(57) ABSTRACT

An image forming device includes a casing, an image forming unit, a first board, and an operational button. The image forming unit and the first board are disposed in the casing. The first board has a first opening extending through the first board, and a loop antenna disposed around the first opening. The operational button is located in the casing through the first opening. The operational button has a top surface exposed to an exterior of the casing.

12 Claims, 5 Drawing Sheets

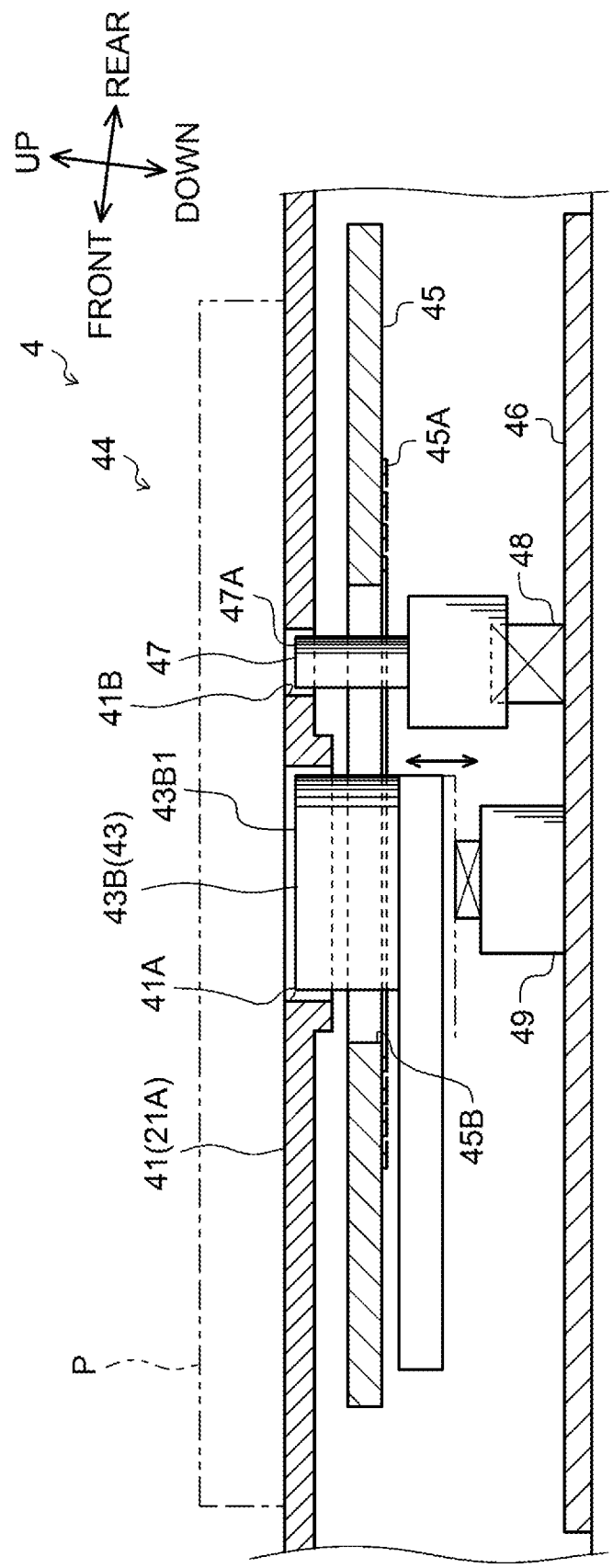

IMAGE FORMING DEVICE HAVING A PANEL BOARD WITH A TACTILE SWITCH

CROSS-REFERENCE TO RELATED APPLICATION

This application claims priority from Japanese Patent Application No. 2018-028909 filed on Feb. 21, 2018, the content of which is incorporated herein by reference in its entirety.

FIELD OF DISCLOSURE

Aspects described herein relate to an image forming device.

BACKGROUND

A known image forming device includes a near field communication ("NFC") board that enables a short-range wireless communication with an information terminal device, such as a smartphone and a tablet device, in compliance with standardized NFC technology. The NFC board may be disposed in an interior space in a panel unit that is a portion of a casing of the image forming device.

SUMMARY

The panel unit has a control board for controlling operations of the image forming device and operational buttons/keys, as well as the NFC board arranged in the interior space. Such arrangements may require a relatively large interior space in the panel unit to accommodate the control board, the operational buttons, and the NFC board therein.

One or more aspects of the disclosure provide a space-saving image forming device that includes a NFC board for a short-range wireless communication with an information terminal device.

According to one or more aspects of this disclosure, an image forming device includes a casing, an image forming unit, a first board, and an operational button. The image forming unit and the first board are disposed in the casing. The first board has a first opening extending through the first board, and a loop antenna disposed around the first opening. The operational button is located in the casing through the first opening. The operational button has a top surface exposed to an exterior of the casing.

According to one or more aspects of this disclosure, an image forming device includes a casing, an image forming unit disposed in the casing, an antenna board, an operational button, and a panel board disposed below the antenna board. The casing includes an upper exterior surface having a first upper-surface opening. The antenna board is disposed below the upper exterior surface. The antenna board has an antenna-board opening extending through the antenna board, and a loop antenna disposed around the antenna-board opening. The operational button is located in the first upper-surface opening and the antenna-board opening. The operational button has a top surface such that the top surface is exposed to an exterior of the casing through the first upper-surface opening. The top surface is located below the upper exterior surface. The panel board includes a tactile switch located under the operational button. The tactile switch is configured to be actuated by having the operational button contact the tactile switch.

BRIEF DESCRIPTION OF THE DRAWINGS

FIG. 5 is a cross-sectional view of the panel unit, taken along a line A-A of FIG. 2 and viewed in a direction of an arrow.

DETAILED DESCRIPTION

Referring to FIGS. 1-5, a multi-function peripheral device ("MFP") 1 will now be described.

Figure 1:
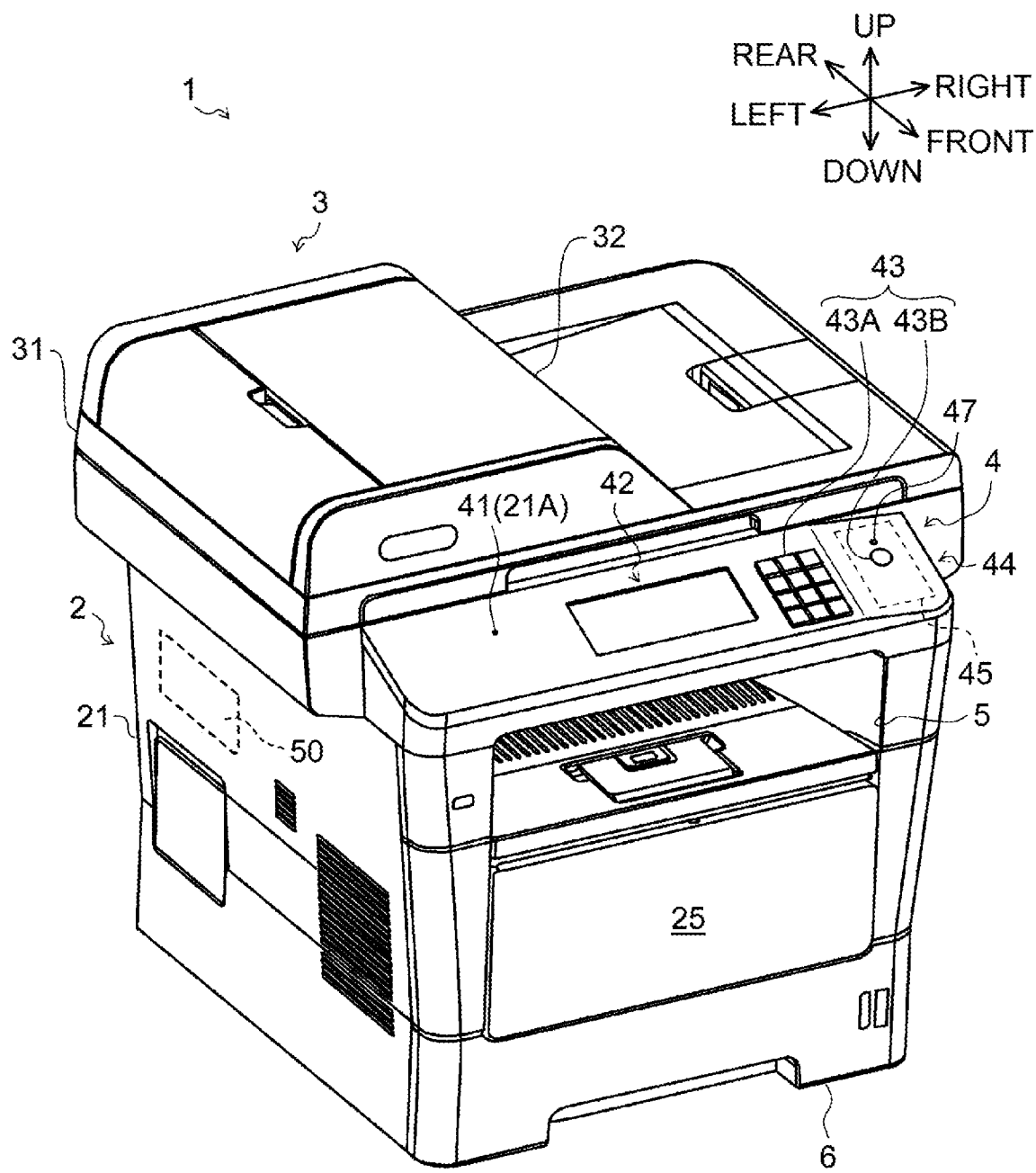
FIG. 1 is a perspective view of a multi-function peripheral device ("MFP") including an image forming device in an illustrative embodiment according to one or more aspects of the disclosure.

Respective directions of front, rear, left, right, up, and down are defined in conjunction with an orientation in which the MFP 1 is intended to be used, as depicted in FIG. 1. A side of the MFP 1 having a panel unit 4 may be defined as a front side.

[Overall Configuration of MFP 1]

Referring to FIG. 1, an overall configuration of the MFP 1 will now be described.

The MFP 1 includes a casing 21, an image forming device, e.g., a printer unit 2, a scanner unit 3, a panel unit 4, a sheet cassette 6, and a controller 50.

The casing 21 has a box-shape. The casing 21 includes an upper front surface 21A that defines a portion of the panel unit 4. The panel unit 4 is disposed at an upper front portion of the casing 21.

The casing 21 has a sheet output port 5 below the panel unit 4. Through the sheet output port 5, a sheet having an image formed by the printer unit 2 is output. The sheet cassette 6 is disposed below the sheet output port 5. The sheet cassette 6 is configured to hold a stack of one or more sheets.

The printer unit 2 is disposed below the scanner unit 3. The printer unit 2 includes an image forming unit 25 disposed in the casing 21. The image forming unit 25 is configured to form an image on a sheet conveyed from the sheet cassette 6 and output the sheet having the image formed thereon through the sheet output port 5.

The image forming unit 25 may form an image based on an electrophotographic method, an inkjet method, or other method.

The scanner unit 3 includes a flatbed cover 31 and an image scanning unit. The image scanning unit is disposed at a position above the printer unit 2 and below the cover 31 (e.g., between the printer unit 2 and the cover 31).

The image scanning unit may be, for example, an image scanner including an image sensor having a light source and a motor. The image sensor is configured to irradiate a document to be scanned, with light from the light source, and converts the light reflected off the document into an electrical signal. The image sensor may be reciprocated by the motor in a left-right direction.

The scanner unit 3 further includes an automatic document feeder ("ADF") 32 configured to feed each of sheets from a document stack to the image sensor, which scans an image on a recording surface of a fed sheet/document.

The controller 50 is disposed in the casing 21. The controller 50 is configured to control operations of the MFP 1 (e.g., the printer unit 2 and the scanner unit 3), based on user's inputs through the panel unit 4.

The controller 50 includes a microcomputer configured to execute a variety of processing for achieving functions of the MFP 1. The functions of MFP 1 include, for example, a printing function, scanning function, and copying function.

[Configuration of Panel Unit 4]

Referring to FIGS. 1-5, configuration of the panel unit 4 will now be described.

As depicted in FIG. 1, the panel unit 4 includes a panel 41, a display 42, an operation unit 43, and a near field communication ("NFC") unit 44. The panel unit 4 is partially defined by the upper front surface 21A of the casing 21. In one example, the upper front surface 21A of the casing 21 is also an upper surface of the panel 41. The panel 41 extends in the left-right direction. The display 42 is disposed in a middle portion of the panel 41 in the left-right direction. The operation unit 43 is disposed to a side (e.g., right side) of the display 42.

The display 42 is configured to display statuses and functions of the MFP 1. The display 42 may include a touchscreen that allows a user to input various settings of the MFP 1. Through the touchscreen, the user may provide instructions to, for example, the printer unit 2.

The touchscreen may include a resistive or capacitive touchscreen panel and a liquid crystal display panel that are layered in their thickness direction.

The operation unit 43 includes a plurality of push keys/buttons, such as first push-buttons 43A and a second push-button 43B. The push-buttons 43A and 43B are arranged at portions of the panel 41.

The first push-buttons 43A are disposed to the right of the display 42. The first push-buttons 43A are arranged in line along the front-rear direction and the left-right direction. The second push-button 43B is disposed to the right of the first push-buttons 43A within the NFC unit 44.

The first push-buttons 43A may be function keys to which a user can assign particular functions. The second push-button 43B may be a power button for turning the MFP 1 on and off Each of the first push-buttons 43A has a top surface to be pushed or pressed by a user. The second push-button 43B also has a top surface 43B1 (in FIGS. 2 and 5) to be pushed or pressed by a user. The top surfaces of the both buttons 43A and 43B are exposed to an exterior of the casing 21 through openings formed in the panel 41. For example, the top surface 43B1 is exposed to the exterior of the casing 21 through an opening 41A formed in the panel 41. The arrangement of the second push-button 43B in the panel 4 will be described in more detail below.

The NFC unit 44 enables short-range wireless communication between the MFP 1 and an information terminal device P (refer to FIG. 5), such as a smartphone and a tablet device, in compliance with standardized NFC technology. The short-range wireless communication in compliance with the NFC technology may be simply referred to as "NFC communication" hereinafter. The standardized NFC technology includes short-range, e.g., approximately 10 cm, wireless communication technologies in compliance with, for example, an international standard of ISO/IEC18092 (NFCIP-1) using a frequency at 13.56 MHz. The NFC unit 44 is disposed to one side (e.g., right side) of the first push-buttons 43A.

The NFC unit 44 includes a first board, e.g., an NFC board 45, and a second board, e.g., a panel board 46 (refer to FIG. 5).

Figure 2:
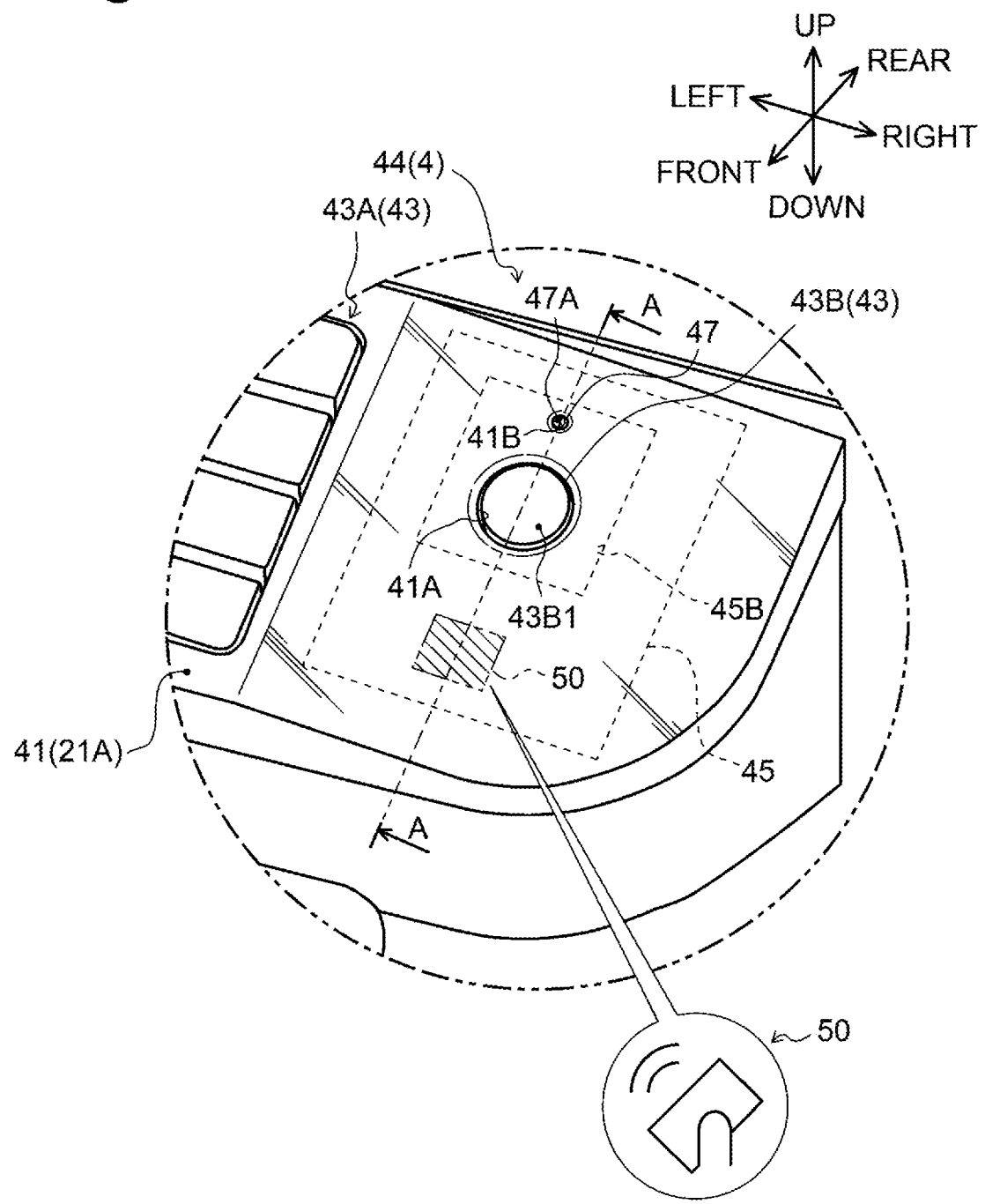
FIG. 2 is a partially enlarged view of a panel unit of the MFP, illustrating a NFC unit and its surrounding components.

As depicted in FIGS. 2 and 5, the NFC board 45 is disposed in an upper front portion of an interior of the casing 21 (e.g., in the NFC unit 44), and faces the panel 41 (e.g., the upper front surface 21A).

The panel board 46 is also disposed in an upper front portion of the interior of the casing 21 (e.g., in the NFC unit 44) and faces the NFC board 45. The panel board 46 is located below the NFC board 45. In other words, the panel board 46 is located further away from the upper front surface 21A than the NFC board 45. The casing 21 (e.g., the panel 41), the NFC board 45, and the panel board 46 are disposed in this order from the top to the bottom (e.g., in a thickness direction of the panel board 46) with a space therebetween.

Figure 4:
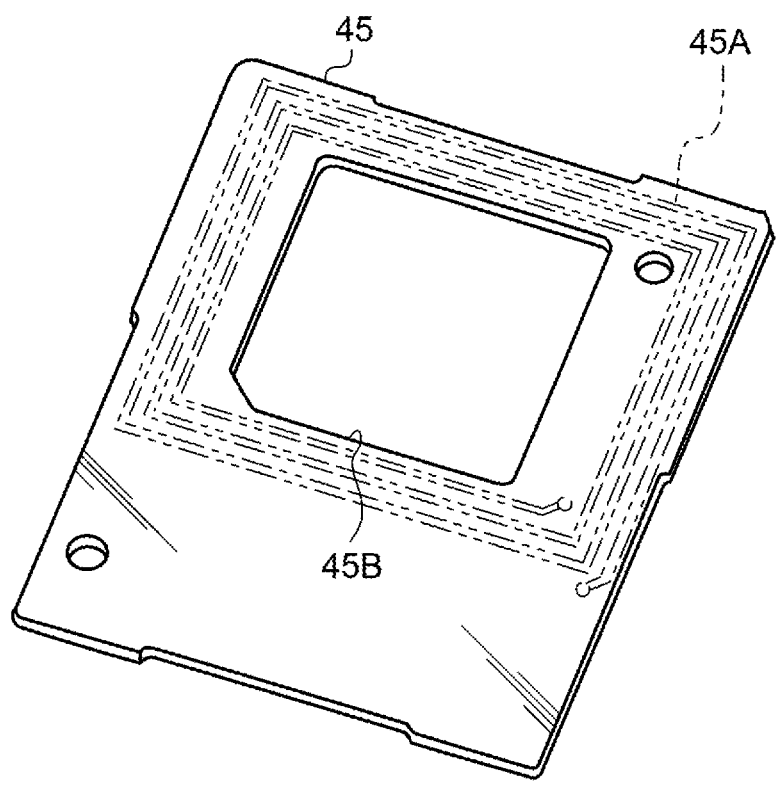
FIG. 4 is a perspective view of an NFC board.

The NFC board 45 is a circuit board that enables NFC communication with an information terminal device P. As depicted in FIG. 4, the NFC board 45 has a loop antenna 45A, an opening 45B, and certain electric circuits.

The loop antenna 45A is configured to transmit to or receive from an information terminal device P, radio waves for NFC communication between the MFP 1 and the information terminal device P.

The opening 45B extends through the NFC board 45 in its thickness direction. The loop antenna 45A is disposed around the opening 45B such that the opening 45B is located inside a loop of the loop antenna 45A.

Figure 3:
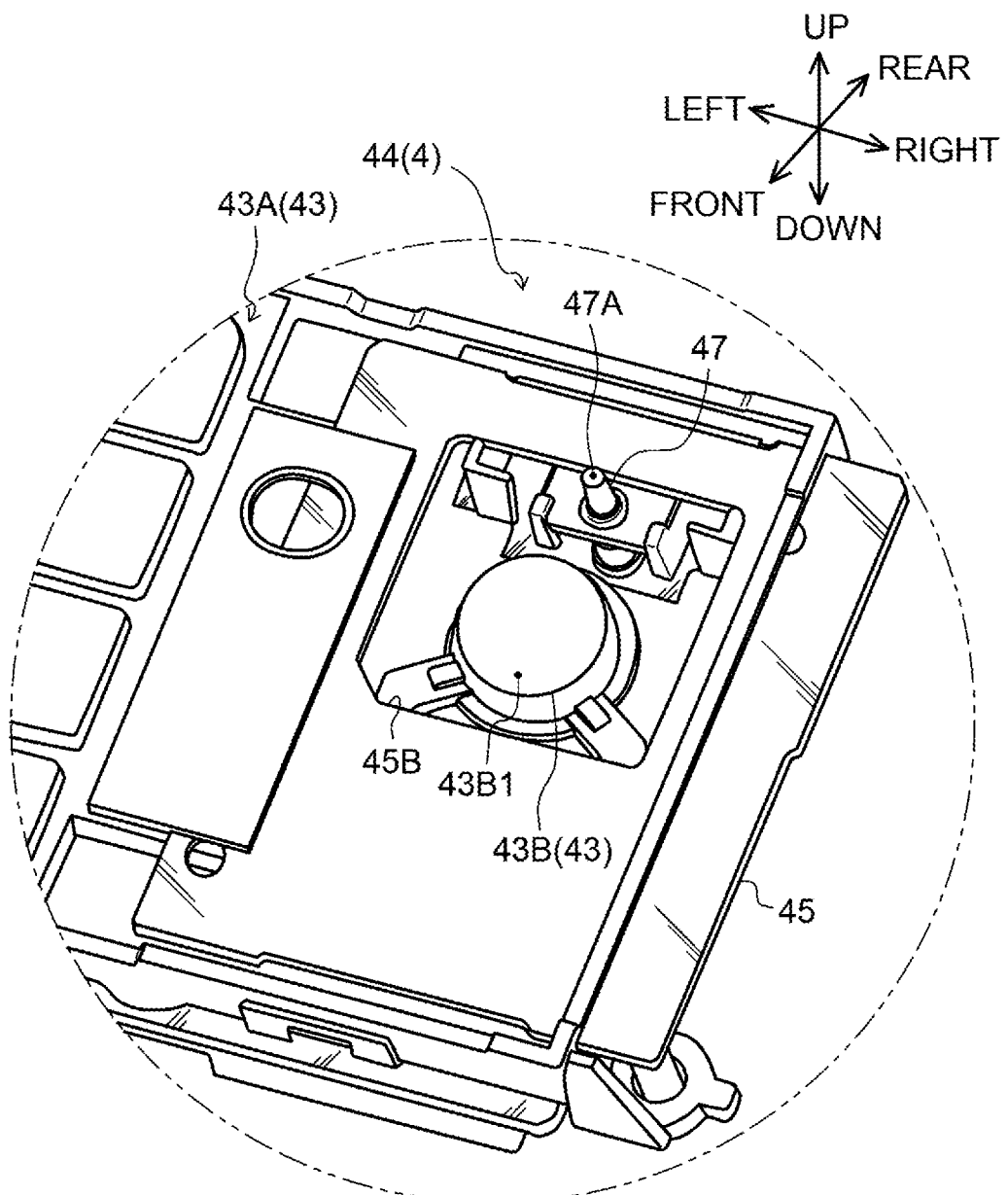
FIG. 3 is a partially enlarged view of the panel unit, illustrating an internal structure of the NFC unit.

As depicted in FIG. 3, the second push-button 43B is disposed in a space defined by the opening 45B of the NFC board 45. The second push-button 43B is accessible through the opening 41A. The NFC board 45 overlaps with the operation unit 43 in plan view.

This configuration may effectively use an interior space of the casing 21, leading to a space-saving printer unit 2.

As described above, the second push-button 43B may be used for turning on or off the MFP 1 and may not be frequently pushed after the MFP 1 is turned on.

Such a push-button 43B is located in the opening 45B of the NFC board 45. This configuration may allow a user to perform an operation necessary for his/her intended function while the information terminal device P is brought closer proximity to the NFC board 45 to establish wireless communication with the NFC board 45.

The panel unit 4 further includes a light guide 47 having a top surface 47A, and a LED 48 (in FIG. 5). The light guide 47 is disposed near the second push-button 43B. The light guide 47 is configured to convey the light of the LED 48 that is turned on and off based on user's pressing of the second push-button 43B (e.g., based on the MFP 1 powered on or off).

The light guide 47 is also disposed in the space defined by the opening 45B of the NFC board 45, similar to the second push-button 43B. The light guide 47 is also accessible through another opening 41B formed in the panel 41.

The top surface 47A of the LED light guide 47 is also exposed to an exterior of the casing 21 through the opening 41B. The top surface 47A does not protrude above the panel 41, but is located in the opening 41B, as depicted in FIG. 5.

The second push-button 43B is disposed such that the top surface 43B1 is located below a portion of the upper front surface 21A of the casing 21 (e.g., the upper surface of the panel 41) where the opening 41A is formed. In other words, the top surface 43B1 is located closer to the panel board 46 than the upper surface of the panel 41 is to the panel board 46.

In the illustrative embodiment, the top surface 43B1 of the second push-button 43B and the top surface 47A of the LED light guide 47 do not protrude above the upper surface of the panel 41 but are located in the corresponding openings 41A and 41B.

This configuration may prevent or reduce the second push-button 43B and the LED light guide 47 from contacting or interfering with the information terminal device P (e.g., a smartphone or a tablet device) that is brought into close proximity to or brought into contact with the upper surface of the panel 41 in order to perform the NFC communication with the NFC board 45. In other words, this configuration may prevent or reduce such occasions that the second push-button 43B is inadvertently pressed with the information terminal device P, and the controller 50 causes a unit or component of the MFP 1 to perform an unintended or undesired function or operation.

The panel board 46 is connected to the display 42, the NFC board 45, and the controller 50. The panel board 46 is configured to process signals input through the panel unit 4 and to output the processed signals to the controller 50.

As described above, the panel board 46 is disposed below the NFC board 45 and is located further away from the panel 41 than the NFC board 45. Since the panel board 46 is spaced from the panel 41, the panel board 46 may be less subjected to static electricity, which may be generated when the information terminal device P is brought into close proximity to the NFC board 45 from an outside or above the panel 41.

The panel board 46 includes an actuator, e.g., a tactile switch 49, configured to be actuated by the pressing or pushing of the second push-button 43B.

The tactile switch 49 is disposed on a surface of the panel board 46 closer to the NFC board 45 (e.g., an upper surface of the panel board 46). The tactile switch 49 overlaps with the top surface 43B1 of the push-button 43B in plan view or in the thickness direction of the panel board 46 (e.g., up-down direction).

The tactile switch 49 is disposed directly under the top surface 43B1 of the second push-button 43B. This configuration may prevent or reduce malfunctions of the tactile switch 49 and may improve endurance of the tactile switch 49 because the pressing force of the second push-button 43B may be perpendicularly applied to the tactile switch 49.

In view of inadvertent pressing or touching of the first push-buttons 43A and/or the second push-button 43B with the information terminal device P, the first push-buttons 43A and the second push-button 43B may be disabled while the NFC board 45 is performing the NFC communication with the information terminal device P via the loop antenna 45A. This configuration may prevent or reduce the controller 50 from performing an unintended or undesired function or operation if the information terminal device P should press or touch the first push-buttons 43A and/or the second push-button 43B.

As depicted in FIG. 2, the NFC unit 44 has an indication 50 at a right end portion of the panel 41 where the NFC board 45 is located. The indication 50 indicates a portion where an information terminal device P is to be placed on or over to establish the NFC communication with the MFP 1.

The indication 50 may help rapid identification of the location where the information terminal device P is to be placed on or over for the NFC communication with the MFP 1. Using the indication 50 as a guide, the user may exactly bring the information terminal device P into close proximity to the NFC unit 44 or may place the device P onto the NFC unit 44.

As depicted in FIG. 1, the upper front surface 21A of the casing 21, which is the panel 41, has an inclined portion at a right end portion thereof. The inclined portion faces the NFC board 45. The inclined portion extends downward from the left to the right. In other words, the inclined portion is inclined downward in a direction from the display 42 toward the right end portion of the panel 41 facing the NFC board 45.

The inclined portion may prevent or reduce such occasions that an information terminal device P placed on the panel 41 for the NFC communication unintentionally slides toward the display 42 and thereby presses one or more first push-buttons 43A.

This configuration may prevent or reduce the controller 50 from performing an untended or undesired function or operation.

What is claimed is:

1. An image forming device, comprising:
   a casing including an upper exterior surface, the upper exterior surface having a first upper-surface opening;
   an image forming unit disposed in the casing;
   an antenna board disposed below the upper exterior surface, the antenna board having an antenna-board opening extending through the antenna board, and a loop antenna disposed around the antenna-board opening;
   an operational button located in the first upper-surface opening and the antenna-board opening, the operational button having a top surface such that the top surface is exposed to an exterior of the casing through the first upper-surface opening; and
   a panel board disposed below the antenna board, the panel board including a tactile switch located under the operational button,
   wherein
   the top surface is located below the upper exterior surface, and
   the tactile switch is configured to be actuated by having the operational button contact the tactile switch.

2. The image forming device according to claim 1, further comprising:
   a touchscreen disposed at a first portion of the upper exterior surface;
   wherein
   the antenna board is disposed below a second portion of the upper exterior surface, and
   the second portion of the upper exterior surface is inclined downward in a direction away from the first portion of the upper exterior surface.

3. The image forming device according to claim 1, further comprising:
   a controller configured to disable output from the tactile switch while the antenna board is performing communication with an information terminal device via the loop antenna.

4. The image forming device according to claim 1, wherein
   the upper exterior surface has a second upper-surface opening,
   the image forming device further comprises:
   a light guide located in the second upper-surface opening and the antenna-board opening, the light guide having a top surface such that the top surface of the light guide is exposed to the exterior of the casing through the second upper-surface opening, and
   the top surface of the light guide is located below the upper exterior surface.

5. The image forming device according to claim 4, wherein the panel board further includes an LED located under the light guide.

6. The image forming device according to claim 5, further comprising:
- a touchscreen disposed at a first portion of the upper exterior surface;

wherein the antenna board is disposed below a second portion of the upper exterior surface, and the second portion of the upper exterior surface is inclined downward in a direction away from the first portion of the upper exterior surface.

7. An image forming device, comprising:
- a casing including an upper exterior surface, the upper exterior surface having a first upper-surface opening;
- an image forming unit disposed in the casing;
- an antenna board disposed below the upper exterior surface, the antenna board having an antenna-board opening extending through the antenna board, and a loop antenna disposed around the antenna-board opening;
- an operational button located in the first upper-surface opening and the antenna-board opening, the operational button having a top surface such that the top surface is exposed to an exterior of the casing through the first upper-surface opening; and
- a panel board disposed below the antenna board, the panel board including a tactile switch located under the operational button, wherein the tactile switch is configured to be actuated by having the operational button contact the tactile switch.

8. The image forming device according to claim 7, further comprising:
- a touchscreen disposed at a first portion of the upper exterior surface;

wherein the antenna board is disposed below a second portion of the upper exterior surface, the second portion of the upper exterior surface is inclined downward in a direction away from the first portion of the upper exterior surface, and the top surface of the operational button is located below the upper exterior surface.

9. The image forming device according to claim 7, further comprising:
- a controller configured to disable output from the tactile switch while the antenna board is performing communication with an information terminal device via the loop antenna.

10. The image forming device according to claim 7, wherein the upper exterior surface has a second upper-surface opening, the image forming device further comprises:
- a light guide located in the second upper-surface opening and the antenna-board opening, the light guide having a top surface such that the top surface of the light guide is exposed to the exterior of the casing through the second upper-surface opening.

11. The image forming device according to claim 10, wherein the panel board further includes an LED located under the light guide.

12. The image forming device according to claim 11, further comprising:
- a touchscreen disposed at a first portion of the upper exterior surface;

wherein the antenna board is disposed below a second portion of the upper exterior surface, the second portion of the upper exterior surface is inclined downward in a direction away from the first portion of the upper exterior surface, and the top surface of the operational button is located below the upper exterior surface, and the top surface of the light guide is located below the upper exterior surface.

* * * * *